E. A. GEHRKE.
TAP SCREW FOR PLUGGING LEAKS.
APPLICATION FILED APR. 14, 1909.
951,437.
Patented Mar. 8, 1910.
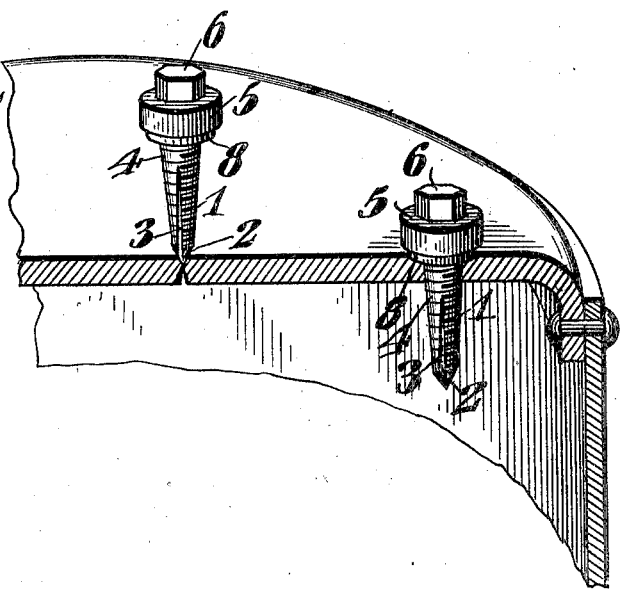
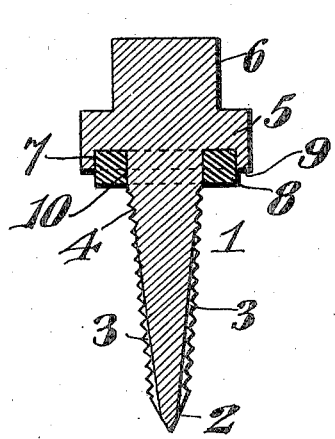
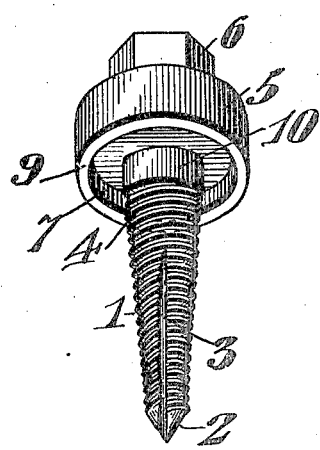
E. A. Gehrke, Inventor

UNITED STATES PATENT OFFICE.

EDWARD A. GEHRKE, OF LINCOLN, NEBRASKA.

TAP-SCREW FOR PLUGGING LEAKS.

951,437.  Specification of Letters Patent.   Patented Mar. 8, 1910.

Application filed April 14, 1909.  Serial No. 489,828.

*To all whom it may concern:*

Be it known that I, EDWARD A. GEHRKE, a citizen of the United States, residing at Lincoln, in the county of Lancaster and State of Nebraska, have invented a new and useful Tap-Screw for Plugging Leaks, of which the following is a specification.

The invention relates to improvements in tap screws for plugging leaks.

The object of the present invention is to improve the construction of tap screws for plugging leaks, and to provide simple and easily operated means for effectively stopping the leaks of boilers, pipes, etc., and equipped with means for holding and preventing a fiber gasket from breaking when pressure is applied.

The invention also has for its object to provide a tap screw plug of this character, adapted to prevent injury to a boiler should it be screwed too tightly into the same.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing:—Figure 1 is a sectional perspective view of a portion of a boiler, illustrating the manner of repairing leaks with tap screw plugs, constructed in accordance with this invention. Fig. 2 is a longitudinal sectional view of the tap screw plug. Fig. 3 is a perspective view of the same.

Like numerals of reference designate corresponding parts in all the figures of the drawing.

1 designates a tap screw plug, consisting of a tapered threaded shank or stem 2, having a smooth tapered point and provided with longitudinal tap grooves 3. The tap screw is adapted to cut and thread its way into the leaking portion of a boiler, pipe, or the like in a manner similar to an ordinary machinist's tap. The grooves terminate short of the upper end of the threaded stem, which is provided with a smooth uninterrupted threaded portion 4, to finally engage the boiler or pipe to which the screw plug is applied.

The tap screw plug is provided with a round head 5, reduced at the outer end to provide a polygonal wrench-receiving portion 6, and provided at its inner engaging face with an annular recess 7 for the reception of a fiber gasket 8. The annular recess forms an outer annular wall or flange 9, arranged at the periphery of the gasket and adapted to hold the same in place and prevent the gasket from breaking or crowding out from under the head when pressure is applied thereto. The fiber gasket projects beyond the lower edge of the outer wall or flange in order to make a water tight joint, as the gasket must be drawn down very tight against the boiler for this purpose. The outer wall or flange not only prevents the gasket from being broken and forced outward from under the head, but it also limits the inward movement of the tap screw to prevent the same from cracking a boiler.

The head of the screw presents a flat engaging face to the gasket, and the screw or stem is provided at the gasket with a smooth cylindrical portion 10, the threads terminating at the engaging face of the gasket and short of the lower edge of the outer wall of the recess, as clearly shown in Figs. 2 and 3 leaving that portion of the stem smooth so as to avoid cutting the inner edge of the gasket and weakening the latter. By this construction the device is prevented from cracking or injuring a boiler should it be screwed too tightly or too far into the same.

The tap screw plug is designed to be constructed in various sizes to adapt it to different kinds of boilers and pipes, and the head of the screw and the gasket will vary with the size of the device.

Having thus fully described my invention, what I claim as new and desire to secure by Letters Patent, is:—

In combination with a gasket, a tap screw plug consisting of a tapered threaded stem having tap grooves, and a head provided with an annular recess receiving the gasket and forming an outer wall or flange adapted to hold the gasket in place and prevent the same from breaking and spreading when pressure is applied, said gasket projecting downward beyond the lower edge of the wall or flange, so that the gasket may be drawn down tightly against a boiler to form a water tight joint, and the said outer wall or flange operating as a stop to limit the inward movement of the tap screw to prevent the same from cracking the boiler, and the threads of the stem terminating at the gasket leaving that portion of the stem smooth, which fits within the opening of the gasket.

In testimony, that I claim the foregoing as my own, I have hereto affixed my signature in the presence of two witnesses.

EDWARD A. GEHRKE.

Witnesses:
W. C. FRAMPTON,
JOHN J. LEDWITH.